Patented Feb. 28, 1950

2,499,186

UNITED STATES PATENT OFFICE 2,499,186

2-VINYLDIBENZOTHIOPHENE AND METHOD OF PREPARING THE SAME

Ralph G. Flowers and Leola W. Flowers, Pittsfield, Mass., assignors to General Electric Company, a corporation of New York No Drawing. Application June 17, 1948, Serial No. 33,674

5 Claims. (Cl. 260—329)

The present invention relates to 2-vinyldibenzothiophene and methods for preparing the said compound.

We have discovered that monovinyldibenzothiophene, more particularly, 2-vinyldibenzothiophene which may be represented by the formula

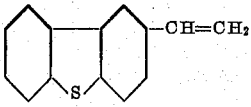

can be prepared by dehydrating an alpha-hydroxyethyldibenzothiophene, more particularly, 2-(alpha-hydroxyethyl)dibenzothiophene which may be represented by the formula

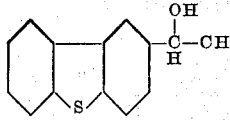

The latter compound can be prepared by reducing or hydrogenating 2-acetyldibenzothiophene under controlled reaction conditions.

In preparing the 2-vinyldibenzothiophene, we have found it advantageous to first acetylate dibenzothiophene with an acetylating agent, for example, acetic acid or anhydride, acetyl chloride or bromide, ketene, etc., to form 2-acetyldibenzothiophene, hydrogenating the latter to 2-(alpha-hydroxyethyl) dibenzothiophene, and dehydrating the 2-(alpha-hydroxyethyl) dibenzothiophene to obtain 2-vinyldibenzothiophene by the removal of a hydrogen atom and a hydroxyl group from the adjacent carbon atoms of the hydroxyethyl radical.

Dibenzothiophene readily undergoes a Friedel-Crafts reaction with acetic anhydride and other acetylating agents in the presence of a Friedel-Crafts agent, e. g., aluminum chloride, aluminum bromide, ferric chloride, etc. The first product of the acetylization, as the reaction is generally carried out, is 2-acetyldibenzothiophene.

In addition, polyacetyldibenzothiophenes, for example, diacetyldibenzothiophenes, may be readily obtained by subjecting the monoketone isomer to further acetylization, if necessary, under more severe conditions. Thus, divinyldibenzothiophenes may be obtained from the diacetyldibenzothiophene by employing the same method as that used for the monovinyldibenzothiophene as hereinafter described.

In order to facilitate control of the acetylization step, we have found it desirable to carry out the reaction in an inert solvent, i. e., a solvent which, under the conditions of reaction, is inert in a Friedel-Crafts reaction. Examples of such solvents are carbon disulfide, nitrobenzene, carbon tetrachloride, etc. In general, the catalyst is dissolved or suspended in the solvent and the mixture of dibenzothiophene and the acetylating agent is then added to the catalyst solution. If desired, the dibenzothiophene and the acetylating agent may be dissolved in a suitable solvent and the Friedel-Crafts catalyst is thereafter added to the solution.

The addition of the reactants to the catalyst solution must be carefully controlled in order that the temperature of the reaction mixture can be maintained in the range necessary for producing the desired ketone. The acetylization is preferably carried out at a temperature of from 30° C. to 45° C. After completion of the reaction, the reaction mass is hydrolyzed and the organic layer is allowed to separate. The following equation illustrates the above-described reaction when acetic anhydride is employed as the acetylating agent and aluminum chloride the Friedel-Crafts catalyst:

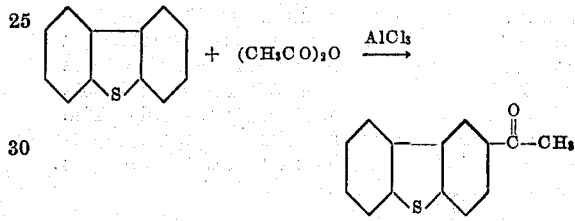

The ketone may be separated from the other products comprising the organic layer as, for example, by distillation.

The next step in the preparation of the monovinyldibenzothiophene is the reduction of the ketone to alpha hydroxyethyldibenzothiophene. This reduction may be carried out, for example, by hydrogenating the monoacetyldibenzothiophene in the presence of a hydrogenation catalyst, for example, finely divided platinum, platinum oxide, palladium, copper-chromium oxide, etc. The hydrogenation is preferably carried out in a solvent medium such as methyl alcohol. It has been found desirable to maintain the hydrogen at superatmospheric pressure, for example, at pressures of the order of 800 to 3,000 pounds/sq. in., preferably at a pressure of about 1,500 pounds/sq. in. The reaction is carried out under such temperatures and for sufficient time to reduce all the ketone or ketones present in the reaction mixture. The reduction of the ketone to the carbinol under the above-described conditions may be illustrated by the following equation:

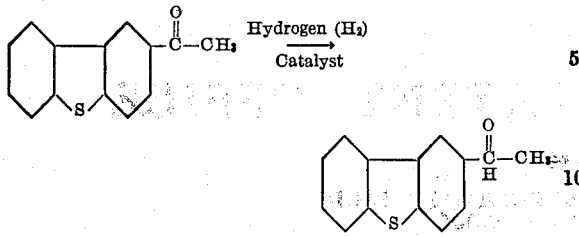

The monovinyldibenzothiophene is prepared from the alpha-hydroxyethyldibenzothiophene by dehydrating the latter. This dehydration reaction may be carried out by reacting the carbinol with any of the usual chemical dehydrating agents such as, for instance, potassium acid sulfate, zinc chloride, phosphoric anhydride, etc. However, we have found that in the production of high boiling polynuclear vinyl compounds, such as those with which our invention is concerned, a direct vapor phase catalytic dehydration is the preferred method. This consists in dehydrating the alpha-hydroxyethyldibenzothiophene in contact with activated alumina ($Al_2O_3$) along or with other metallic oxides, for example, oxides of chromium, tungsten, molybdenum, manganese, etc.; more particularly, by passing the carbinol over the activated alumina or other vapor phase dehydration catalysts in a system which is maintained under reduced pressure, for example, a pressure of 0.1 mm. to 20 mm. mercury.

In carrying out the dehydration, the carbinol dissolved in an inert solvent (for example, an aromatic hydrocarbon solvent, for instance, benzene, toluene, etc.) is fed at a carefully controlled rate to a vertical reaction column packed with catalyst pellets which is maintained at temperatures appreciably above the boiling point of the carbinol at the reduced pressure employed, for example, 325° to 450° C., more particularly, 340° to 360° C. In other words, the carbinol is vaporized as it enters the reaction column and is maintained in the vapor phase in the presence of the catalyst for as long as it is necessary at such temperatures so that polymerization of the monovinyldibenzothiophene, or an undesirable condensation of the carbinol may not result. The following equation illustrates the vapor phase dehydration reaction in which activated alumina is employed as the catalyst.

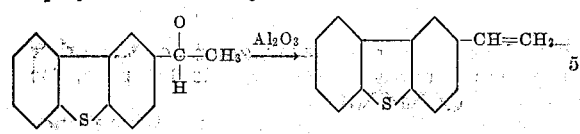

The crude product comprising the monovinyldibenzothiophene may be used as such, but preferably is purified by suitable means as, for example, by recrystallization from a solution. Alcohol and benzene have been found particularly suitable as solvents for carrying out this recrystallization.

In order that those skilled in the art may better understand how the present invention may be practiced, the following examples are given by way of illustration and not by way of limitation.

EXAMPLE 1

*Preparation of 2-acetyldibenzothiophene*

A mixture of 200 grams dibenzothiophene and 89 grams acetyl chloride were dissolved in 1500 cc. carbon disulfide in a 3-liter, 3-necked flask, equipped with a condenser, thermometer and stirrer. The temperature of the mixture was kept at about 35° C. while 400 grams of powdered aluminum chloride was slowly added. The temperature was then raised to 47° C. for 6 hours. The reaction mixture was thereafter hydrolyzed by pouring it into a mixture of ice and hydrochloric acid. The product was then extracted with ether and the ether evaporated. The residue was mixed with methyl alcohol and crystallization of the mass allowed to take place. The small amount of crystals which separated out and were identified as 2,8-diacetyldibenzothiophene, M. P. 208–209° C., was removed by filtration and the residue fractionally distilled under vacuum to yield a large fraction boiling at about 198–204° C. at 2 mm. This material recrystallized readily from methyl alcohol to yield 2-acetyldibenzothiophene, M. P. 111–112° C.

EXAMPLE 2

*Preparation of 2-(alpha-hydroxyethyl)dibenzothiophene*

A portion of the 2-acetyldibenzothiophene (97.8 grams) prepared above was dissolved in 1400 cc. absolute methyl alcohol and thereafter heated with shaking in a hydrogenation bomb in the presence of 7 grams of copper-chromium oxide catalyst and hydrogen gas. A pressure of 1740 pounds of hydrogen was introduced into the bomb at the start of the reaction. The temperature was held at 130° C. for 5 hours. The product thus obtained was filtered and recrystallized from alcohol as white needles having a M. P. of 61.0–62.0° C. Analysis of the latter product showed the following results:

| | Per Cent Carbon | Per Cent Hydrogen | Per Cent Sulfur |
|---|---|---|---|
| 2-(alpha - hydroxyethyl) - dibenzothiophene: | | | |
| Calc. | 73.56 | 5.26 | 14.03 |
| Found | 73.87 | 5.13 | 13.85 |

EXAMPLE 3

*Preparation of 2-vinyldibenzothiophene*

38 grams of 2-(alpha-hydroxyethyl) dibenzothiophene dissolved in 200 cc. benzene were added dropwise into a vertical column packed with aluminum oxide pellets. The column was held at a temperature of 325°–350° C. during the reaction and the reacting vapors were drawn through the column by a vacuum pump which maintained a pressure of about 10 mm. on the system. The product issuing from the tube was recrystallized from ethyl alcohol as small white needles, melting at 45.0°–45.5° C. which was identified as essentially pure 2-vinyldibenzothiophene as evidenced by the following analytical results:

| | Per Cent Carbon | Per Cent Hydrogen | Per Cent Sulfur |
|---|---|---|---|
| 2-vinyldibenzothiophene: | | | |
| Calc. | 79.96 | 4.76 | 15.23 |
| Found | 79.98 | 4.77 | 15.09 |

EXAMPLE 4

The monomeric compound 2-vinyldibenzothiophene may also be prepared as follows:

Eight parts, by weight, 2-(alpha-hydroxyethyl)-dibenzothiophene and 0.1 part of the inhibitor, p-tertiary butyl catechol, were heated gently in a porcelain crucible until they were melted. One part anhydrous copper sulfate was added to the mixture and the entire mass warmed gently for a few minutes. The 2-vinyldibenzothiophene thus formed was recrystallized from alcohol in the same manner as employed in Example 3 above.

In general, the polymerization of the monovinyldibenzothiophene may be inhibited by the same compounds that inhibit the polymerization of styrene, for example, catechol, hydroquinone, etc. Such inhibitors may be washed out of the monomer with a dilute caustic solution if desired; or polymerization may be carried out in the presence of a small amount of inhibitor at an elevated temperature with or without a polymerization catalyst.

2-vinyldibenzothiophene is especially suitable for use in the preparation of polymers and copolymers that are useful in various industrial applications, for example, in the plastics and coating arts and as dielectric materials in the dielectric art. It may also be employed as starting materials in the preparation of other organic compounds. The homopolymer and copolymers of 2-vinyldibenzothiophene and methods of preparing the same are more particularly disclosed and claimed in our copending application Serial No. 33,675, filed concurrently herewith and assigned to the same assignee as the present invention.

What we claim as new and desire to secure by Letters Patent of the United States is:

1. 2-vinyldibenzothiophene.

2. The method of preparing 2-vinyldibenzothiophene which comprises dehydrating 2-(alpha-hydroxyethyl) dibenzothiophene by heating the latter thereby removing a hydrogen atom and a hydroxy group from adjacent carbon atoms of the alpha hydroxyethyl radical.

3. The method of preparing 2-vinyldibenzothiophene which comprises causing 2-(alpha-hydroxyethyl) dibenzothiophene to contact activated alumina at an elevated temperature thereby to dehydrate the 2-(alpha-hydroxyethyl)-dibenzothiophene to the aforementioned 2-vinyldibenzothiophene.

4. The method of preparing 2-vinyldibenzothiophene which comprises passing a solution of 2-(alpha-hydroxyethyl) - dibenzothiophene over a dehydration catalyst at an elevated temperature of the order of from 325° to 450° C. thereby to obtain 2-vinyldibenzothiophene.

5. The method of preparing 2-vinyldibenzothiophene which comprises (1) forming a solution in an aromatic hydrocarbon solvent of 2-(alpha-hydroxyethyl) dibenzothiophene and (2) passing the aforesaid solution over heated activated alumina at a temperature of from about 325 to 450° C.

RALPH G. FLOWERS.
LEOLA W. FLOWERS.

REFERENCES CITED

The following references are of record in the file of this patent:

UNITED STATES PATENTS

| Number | Name | Date |
|---|---|---|
| 1,997,744 | Putzer | Apr. 16, 1935 |

FOREIGN PATENTS

| Number | Country | Date |
|---|---|---|
| 426,476 | Germany | Mar. 1926 |
| 601,568 | Great Britain | May 7, 1947 |

OTHER REFERENCES

Journal Organic Chem. 13, May, 1948, pp. 729 to 734.

Frank, Ind. and Eng. Chem., Mar., 1948, pp. 420–422.